(No Model.)  2 Sheets—Sheet 1.

J. T. BRANNIAN.
COMBINED HAY RAKE AND LOADER.

No. 287,903. Patented Nov. 6, 1883.

Witnesses.
Louis F. Gardner
E. D. York

Inventor.
Jas. T. Brannian,
per
F. A. Lehmann,
Att'y

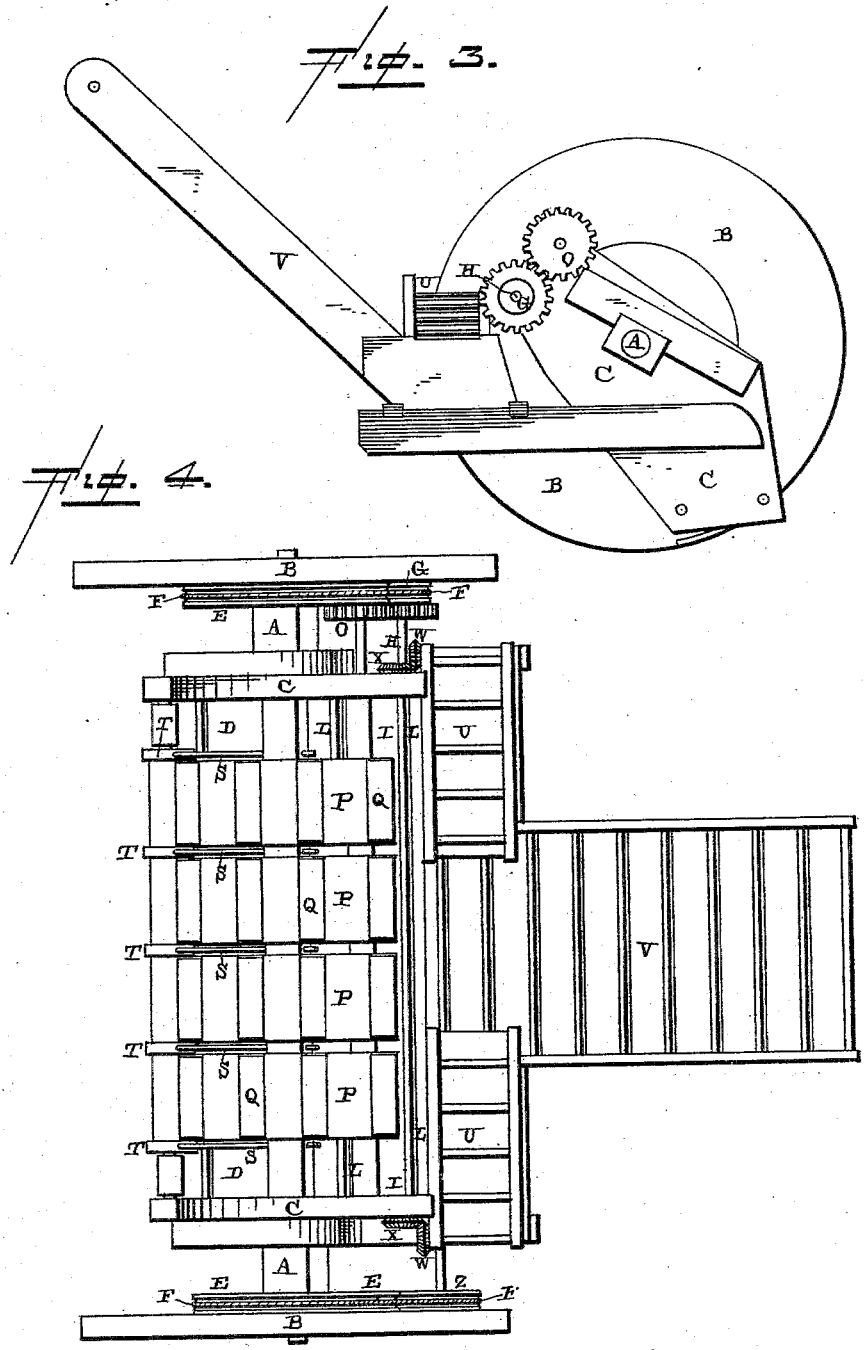

UNITED STATES PATENT OFFICE.

JAMES T. BRANNIAN, OF RANDOLPH, IOWA.

COMBINED HAY RAKE AND LOADER.

SPECIFICATION forming part of Letters Patent No. 287,903, dated November 6, 1883.

Application filed January 23, 1883. (No model.)

*To all whom it may concern:*

Be it known that I, JAMES T. BRANNIAN, of Randolph, in the county of Fremont and State of Iowa, have invented certain new and useful Improvements in a Combined Hay Rake and Loader; and I do hereby declare the following to be a full, clear, and exact description of the invention, such as will enable others skilled in the art to which it pertains to make and use it, reference being had to the accompanying drawings, which form part of this specification.

My invention relates to an improvement in combined hay rakes and loaders; and it consists in the combination of the wide endless belt, the rake-teeth, and a series of narrow belts with small endless belts, which are placed at right angles to the large belts, and which catch the hay that is carried up at the corners of the two sets of belts and convey it to the carrier at the center of the machine.

The object of my invention is to provide a machine which will take the hay from the ground as it is left by the mower, and load it upon the wagon as the wagon is driven across the field.

Figure 1:
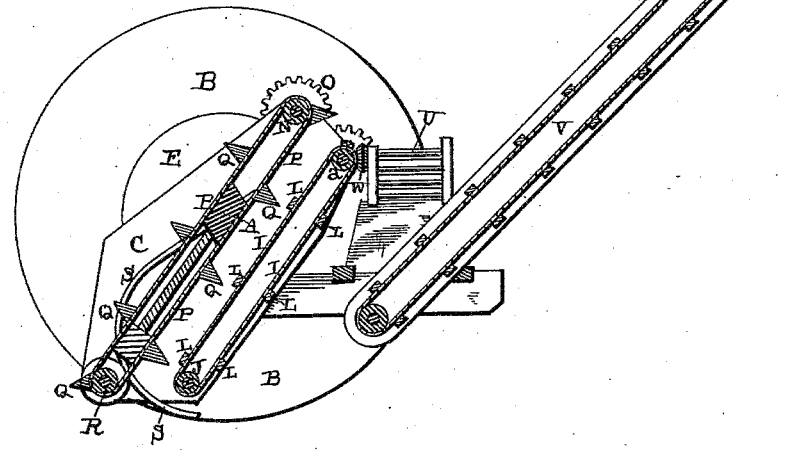
Figure 2:
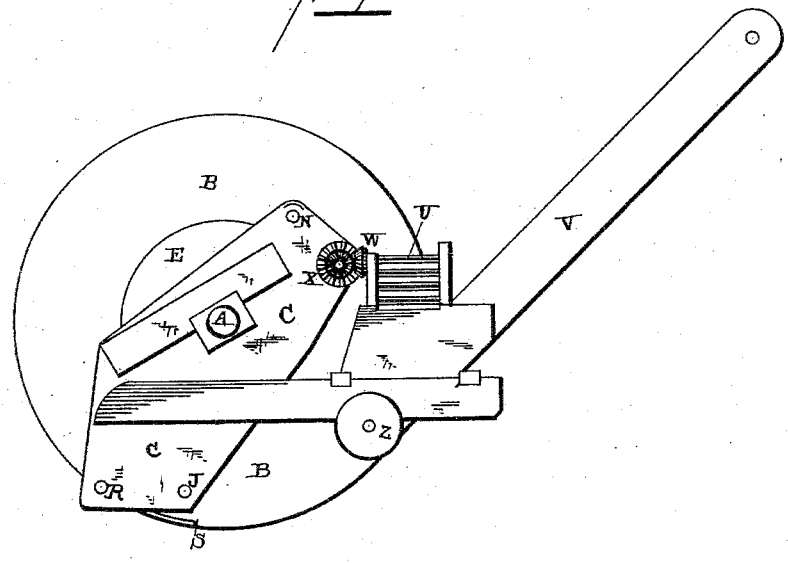

Figure 1 is a vertical longitudinal section of my invention. Figs. 2 and 3 are side elevations of the same, taken from opposite sides, with the near driving-wheel removed. Fig. 4 is a plan view of my invention.

A represents the axle, upon which the two driving-wheels B loosely revolve. Secured rigidly to this axle are the side pieces, C, which are connected together near their rear ends by a cross-bar, D. These pieces are also connected together by the shafts, which pass through them. Each of the driving-wheels is provided with a suitable pulley, E, upon its inner side, around which passes a driving chain or wire, F.

At one end of the machine the driving chain or belt F passes around a grooved pulley, G, which has cogs formed upon its inner end, and which pulley is secured to the shaft H, which passes through the front corner of the side pieces, C. Upon this shaft H, in between the side pieces, is placed a long roller, *a;* or the roller and shaft may be made in a single piece, if so preferred. This shaft or roller *a* gives motion to the wide endless belt I, which extends from one side piece, C, to the other. Also, journaled in between the rear ends of the side pieces is a second roller, J, around which the wide endless belt passes. This second roller, J, is moved by the belt, but has no movement imparted to it from any other source, and serves merely to keep the wide endless belt in position. This wide endless belt is provided with suitable cross-slats, L, for the purpose of taking hold of the hay and forcing it upward.

Journaled in the upper front corner of the side pieces, C, is a shaft or roller, N, which receives a rotary motion in an opposite direction from the roller which moves the wide belt through the spur-wheel O, which meshes with the teeth upon the grooved cogged pulley just below it. Passing around this roller N, and receiving the motion in an opposite direction from the wide endless belt below them, are a series of narrow endless belts, P, which are provided with the cross bars or slats Q. These belts pass around a second roller, R, at the rear corner of the side pieces, C, and are kept separate from each other and from striking against the rake-teeth S by means of the friction wheels or disks T, which are placed between them. In order to allow these belts to move freely, the under side of the axle is cut away between the end pieces, C, as shown.

The rake-teeth are secured to the axle in any suitable manner, and extend backward between the narrow endless belts to the ground. As the machine is drawn along, these teeth rake up the hay, and then the wide endless belt and the series of narrow endless belts, moving in opposite directions, catch this hay and carry it forward between them to the front edge of the machine.

As the machine is intended to be much wider than an ordinary wagon, it becomes necessary to make some provision by which the hay can be delivered to the wagon in a stream or body not wider than the wagon itself. For this purpose two small endless carriers, U, are placed at right angles to the plane of operation of both the wide belt and the series of narrow ones, so as to catch that hay which is carried up near the side pieces C, and convey it to the endless carrier V, which delivers the hay upon the wagon. These two small endless carriers U are provided with operating-rollers at their upper ends, which rollers are provided with beveled gears W, which mesh with corresponding gears, X, upon the driving-shaft, which passes through the front corner of the side pieces, C, and operates the large endless carrier. Both of these small carriers U move toward the center of the machine, and hence drop all of the hay which falls upon them upon the central carrier, V. This central carrier, V, receives its motion from one of the operating chains or belts F, which passes around a pulley, Z, placed upon the outer end of the shaft which operates the carrier. This central carrier is made of the same width as the wagon-bed, and hence delivers all of the hay which is brought forward from the teeth directly upon the wagon-bed, behind which this combined hay rake and loader is fastened.

Having thus described my invention, I claim—

In a combined hay rake and loader, the combination of the wide endless belt L, a series of narrow belts, P, which operate in between the rake-teeth S, and suitable mechanisms for operating the belts, and the two endless bands or belts U, placed at right angles to the bands or belts L P and the carrier, the parts being arranged to operate substantially in the manner shown and described.

In testimony whereof I affix my signature in presence of two witnesses.

JAMES T. BRANNIAN.

Witnesses:
H. CLARK ADDY,
THOMAS H. ROWLAND.